United States Patent [19]
Zhao et al.

[11] Patent Number: 5,744,893
[45] Date of Patent: Apr. 28, 1998

[54] BRUSHLESS MOTOR STATOR DESIGN

[75] Inventors: Chi Mou Zhao, Taipei Hsien; Chin Po Liao, Yun Lin Hsien; Shyh-Jier Wang, Hsinchu; Huang Der-Ray, Hsinchu; Ying Tai-Fa, Hsinchu, all of Taiwan

[73] Assignee: Industrial Technology Research Institute, Hsinchu, Taiwan

[21] Appl. No.: 815,585

[22] Filed: Mar. 12, 1997

[30] Foreign Application Priority Data

Nov. 25, 1996 [TW] Taiwan .................... 85218157

[51] Int. Cl.⁶ ............................ H02K 1/12; H02K 1/00
[52] U.S. Cl. ........................ 310/259; 310/216; 310/257
[58] Field of Search ........................ 310/254, 257, 310/258, 259, 216, 217, 42

[56] References Cited

U.S. PATENT DOCUMENTS

| | | | |
|---|---|---|---|
| 4,891,567 | 1/1990 | Fujitani et al. | 318/254 |
| 4,899,075 | 2/1990 | Hasebe | 310/257 |
| 4,987,331 | 1/1991 | Horng | 310/254 |
| 4,994,702 | 2/1991 | Arita | 310/254 |
| 5,093,599 | 3/1992 | Horng | 310/254 |
| 5,233,250 | 8/1993 | De Filippis | 310/156 |
| 5,233,253 | 8/1993 | Nishio et al. | 310/254 |
| 5,492,458 | 2/1996 | Horng | 417/423.7 |
| 5,506,458 | 4/1996 | Pace et al. | 310/67 R |
| 5,610,464 | 3/1997 | Asano et al. | 310/156 |

*Primary Examiner*—Clayton E. LaBalle
*Assistant Examiner*—Michael J. Wallace, Jr.
*Attorney, Agent, or Firm*—Finnegan, Henderson, Farabow, Garrett & Dunner, L.L.P.

[57] ABSTRACT

A brushless motor stator for an axially wound brushless motor with a diametrical air-gap having a plate structure with at least one plate, the profile of the plate comprising: a central circular hole; a number of salient poles surrounding the central circular hole; and a slot opening between every two adjacent said salient poles. The salient poles and those slot openings have the following characteristics: (1) the outer rim of the salient pole is in the form of a circular arc segment whose arc radius $R_S$ satisfies the following inequality relation: $\pi/P \times R_M < R_S < 0.95 R_M$; (2) the neck width $W_S$ of the salient pole satisfies the following inequality relation: $\pi/2P \times R_M < W_S < 2\pi/P \times R_M - g$; (3) the depth $D_S$ of the slot opening satisfies the following inequality relation: $\pi/P \times R_M < D_S < 2.5\pi/P \times R_M$; where $R_M$ reprents the radius from the center to the outer rim of the brushless motor stator; P reprents the number of poles of permanent magnets used in the brushless motor; and g reprents air-gap width between the salient poles and the permanent magnets. The three aforementioned characteristics can be used either individually or in various combinational groups for designing the profile of a stator.

10 Claims, 4 Drawing Sheets

BRUSHLESS MOTOR STATOR DESIGN

BACKGROUND OF THE INVENTION

1. Field of Invention

This invention relates in general to a new type of stator design for brushless motor, and more particularly to the type of stator design used on brushless motor having axial windings and a diametrical air-gap.

2. Description of Related Art

Brushless motor, due to properties such as possible miniaturization, relative flatness and good concealment, are commonly used in small machines as well as some precision automatic controlling systems. At present, brushless motor with permanent magnets can be classified into three main types, namely: diametrically wound with diametrical air-gap, axially wound with axial air-gap and axially wound with diametrical air-gap. Amongst the three, axially wound with diametrical air-gap type of brushless motor has relatively lower production cost and higher yield, and finds application in environment requiring moderately low output torque. For low speed CD-ROM, three-phase axial air-gap type of motor is usually employed as its main shaft driver, and it has the advantage of virtually no cogging torque but suffers from defects such as low efficiency, low torque, manufacturing hardship in winding the stator as well as difficulties in assembling the coil onto the circuit board. High-speed CD-ROM usually employs three-phase diametrical air-gap type of brushless motor as its main shaft driver, and no matter whether an 8 poles 9 slots or a 12 poles 9 slots design is used, the stator is all formed into the shape of grooved radiating teeth with windings around the belly-side of the grooved teeth, and such windings not only is harder and longer to produce, but also suffers from disadvantages such as wire insulation problems, wire breakage and low yield. Moreover, three Hall sensors must be used for a three-phase motor and therefore a minimum of six power transistors are necessary to drive the system boosting up the number of fundamental electrical components and hence driving up the cost.

Single-phase axially wound brushless motor having a diametrical air-gap has already been used. (Related patent: U.S. Pat. No. 4,891,567). This type of motor has only a single axially wound coil inside a plastic bobbin which makes wiring particularly easy, and as a result, increases the yield, lowers the production time while providing good wiring insulation. Moreover, a single-phase brushless motor demands only a single Hall sensor and at most four power transistors for the driving system, and therefore entails a lower production cost. However, due to larger torque ripple, larger cogging torque, lower efficiency and lower torque at high rotating speed for this type of motor, its applications are mostly limited to situations requiring moderate precision and constant rotating speed such as in cooling fans. In axially wound brushless motor with diametrical air-gap, in order to combat motor start-up problems, conventionally its stator is shaped into an nonsymmetrical profile as shown in FIG. 1. Referring to FIG. 1, a salient pole 12 of the stator 10 is nonsymmetrical about the central axis 11, and this type of design helps the rotor avoid stopping at the die point. (Related patent: U.S. Pat. Nos. 4,899,075, 509,599, 4,987,331, 5,492,458). Yet, with a nonsymmetrical stator profile, there will be a corresponding increase in the cogging torque of the motor. Consequently, whenever the power output of the motor is turned up, vibrations and noises will occur compromising the controllability as well as the life of the motor as a result of this cogging torque. Besides, the conventional open slots design of the stator profile has rather small shield effectiveness leading to larger flux leakage and lower inductive torque.

SUMMARY OF THE INVENTION

It is therefore an object of this invention to provide a new type of stator profile for brushless motors so as to reduce the cogging torque and improve the overall working efficiency. Furthermore, the new grooved teeth profile of this invention can refine the effective shield and so reduce magnetic flux leakages.

To achieve the above and related objects, a new type of stator capable of being installed in an axially wound brushless motor with diametrical air-gap is provided. The brushless motor stator has a plate structure with at least one plate whose profile consists of: a central circular hole; a plurality of salient poles surrounding the central hole; and a slot opening between every two adjacent salient poles. The salient poles and the slot openings have the following characteristics:

(1) the outer rim of the salient pole is in the form of a circular arc segment whose arc radius $R_S$ satisfies the following inequality relation:

$$\pi/P \times R_M < R_S < 0.95 R_M;$$

(2) the neck width $W_S$ of the salient pole satisfies the following inequality relation:

$$\pi/2P \times R_M < W_S < 2\pi/P \times R_M - g;$$

(3) the depth $D_S$ of the slot opening satisfies the following inequality relation:

$$\pi/P \times R_M < D_S < 2.5\pi/P \times R_M;$$

wherein $R_M$ means the radius of the outer rim of the brushless motor stator, P means the number of magnetic poles used in the brushless motor, and g means the air-gap width between the salient poles and the permanent magnets.

The three aforementioned characteristics can be used either individually or in various combinational groups for designing the profile of a stator, thus constituting an brushless motor stator design according to this invention.

According to one preferred embodiment of this invention, with regard to improving the profile of the salient poles and slot openings, converting the exterior shape of the salient poles into a circular arc can reduce the cogging torque of the motor. Streamlining the neck section of the salient poles can reduce the magnetic leakage Changing the exterior shape of the slot opening into a proper depth can reduce the leakage of magnetic flux. Therefore the invention increases the effective flux of the motor and thereby the induced electromotive force coefficient (Ke) as well.

BRIEF DESCRIPTION OF THE DRAWINGS

Other objects, features, and advantages of the invention will become apparent from the following detailed description of the preferred but non-limiting embodiments. The description is made with reference to the accompanying drawings in which.

DESCRIPTION OF THE PREFERRED EMBODIMENT

Figure 1:
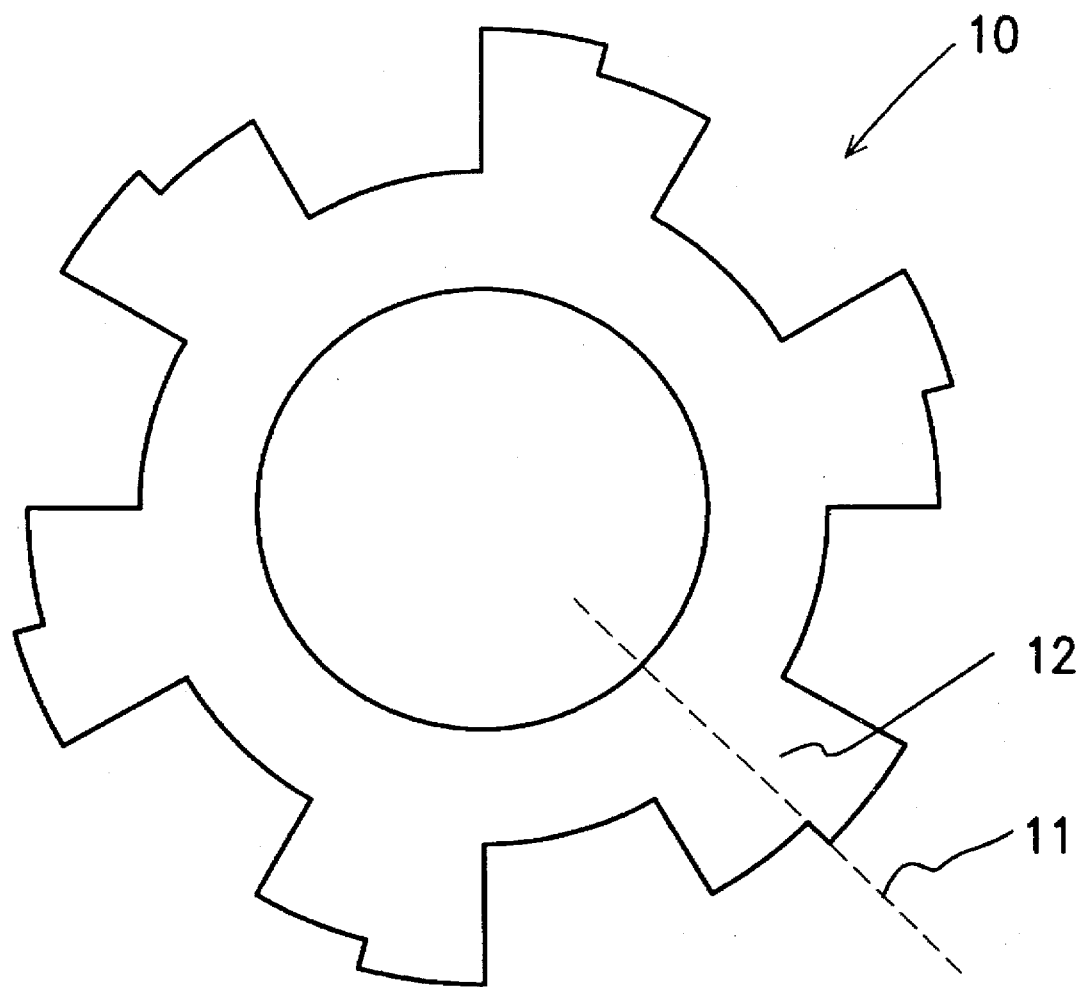
FIG. 1 (Prior Art) is a top view showing the external profile of a conventional brushless motor stator.
Figure 2:
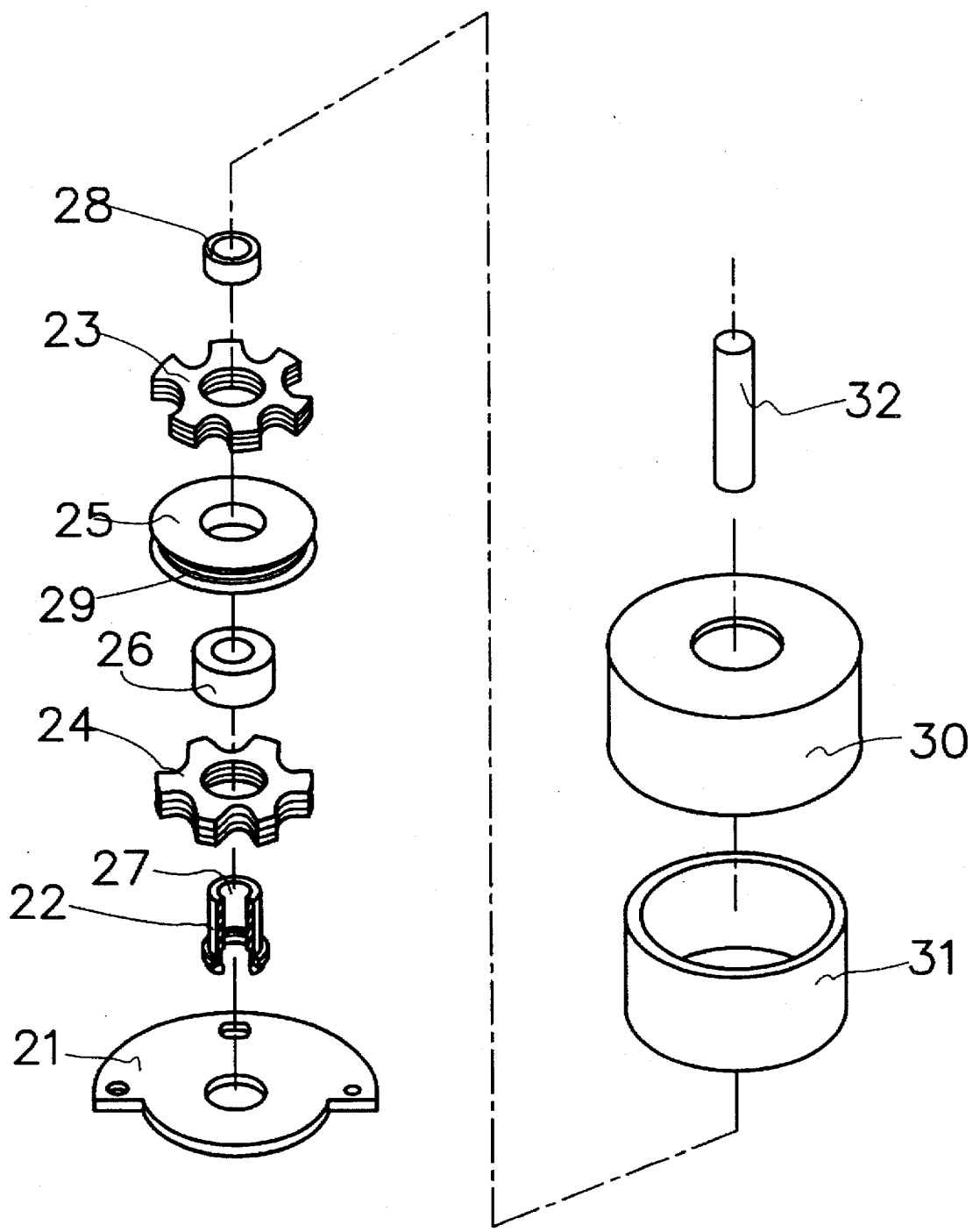
FIG. 2 is an explosive view showing the components of the brushless motor according to a preferred embodiment of the invention.
Figure 3:
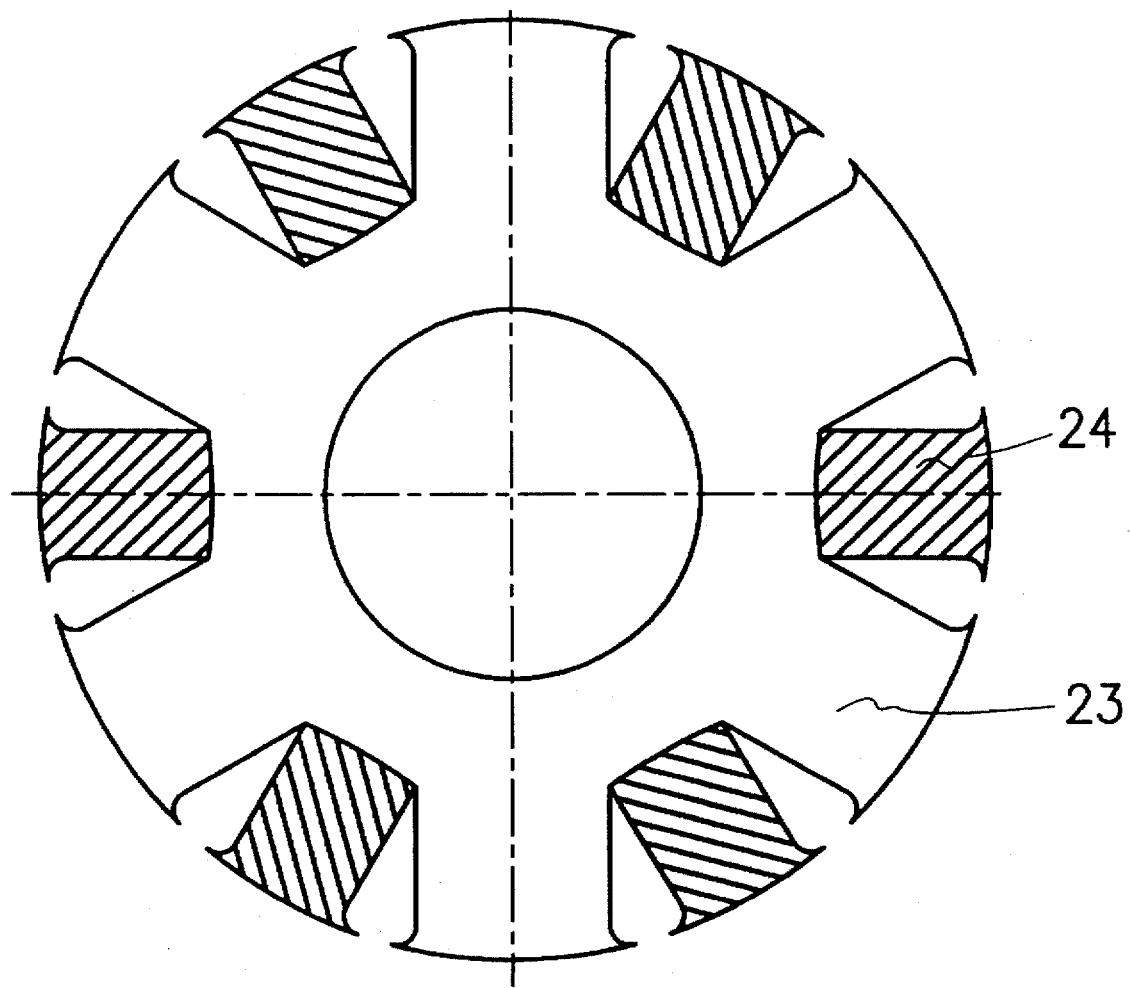
FIG. 3 is a top view showing the top and bottom plates positioned at 180° electronic phase angle with each other in the stator assembly.

Referring first to FIG. 2, FIG. 2 illustrates an explosive view of all the components of an axially wound brushless motor with a diametrical air-gap according to this invention. The main structure of this brushless motor includes two main parts, namely a stator and a rotor. The stator part includes a base plate 21, a permeable sleeve 22, a top magnetic pole plate 23, a bottom magnetic pole plate 24, a plastic wiring bobbin 25 and a permeable ring 26. The base plate 21 is punched out from a uniformly thick sheet of nonmagnetic material. The permeable sleeve 22 is made from metallic sheet materials having good permeability, and has a straight internal hole 27 shaped to a very high precision such that tight tolerance exists between external rim of bearing 28 and the internal diameter of the hole 27. The top and the bottom magnetic pole plates are formed by either a single plate or a stack of plates each having salient poles as well as slot openings made from magnetic materials, for example, silicon steel sheets. The top magnetic pole plate 23 and the bottom magnetic pole plate 24 are both mounted onto the permeable sleeve 22 but positioned in such a way that there is an electronic phase shift of 180° with respect to each other as shown in FIG. 3. Referring to FIG. 3, FIG. 3 is a top view showing the relative positions of the top magnetic pole plate 23 and the bottom magnetic pole plate 24 as assembled, and in it, the unhatched portion represents the top magnetic pole plate 23 while the hatched portion represents the bottom magnetic pole plate 24. Coil windings 29 wraps around the plastic bobbin 25. The plastic bobbin 25 connects with the permeable ring 26. The permeable ring is slided into the permeable sleeve 22, and is positioned between the top magnetic pole plate 23 and the bottom magnetic pole plate 24. The permeable ring 26 is also made from materials having good permeability. The permeable sleeve 22 and the permeable ring 26 in connection with the top magnetic pole plate 23 and the bottom magnetic pole plate 24 together form a magnetic loop. When the coil windings 29 is magnetically excited and thus becoming a magnet, due to flux linkage along the magnetic loop, the salient poles on the top 23 and bottom 24 pole plates are magnetised forming magnetic poles. The rotor part consists of a rotor body—a yoke iron 30, a circular ring magnet 31 and a rotating shaft 32. The circular ring magnet 31 is actually composed of a number of permanent magnets completely surrounding the ring having its N and S poles lining alongside each other alternately. The circular ring magnet 31 is enclosed by the yoke iron 30 which in turn is coupled to the rotating shaft 32, and the shaft is fitted into the bearing hole of bearing 28 inside the permeable sleeve 22. The assembled structure according to the above helps to maintain a constant air-gap width between the external edges of the top 23 and bottom 24 magnetic pole plates and the internal rim of the circular ring magnet 31 in the diametrical direction.

Figure 4:
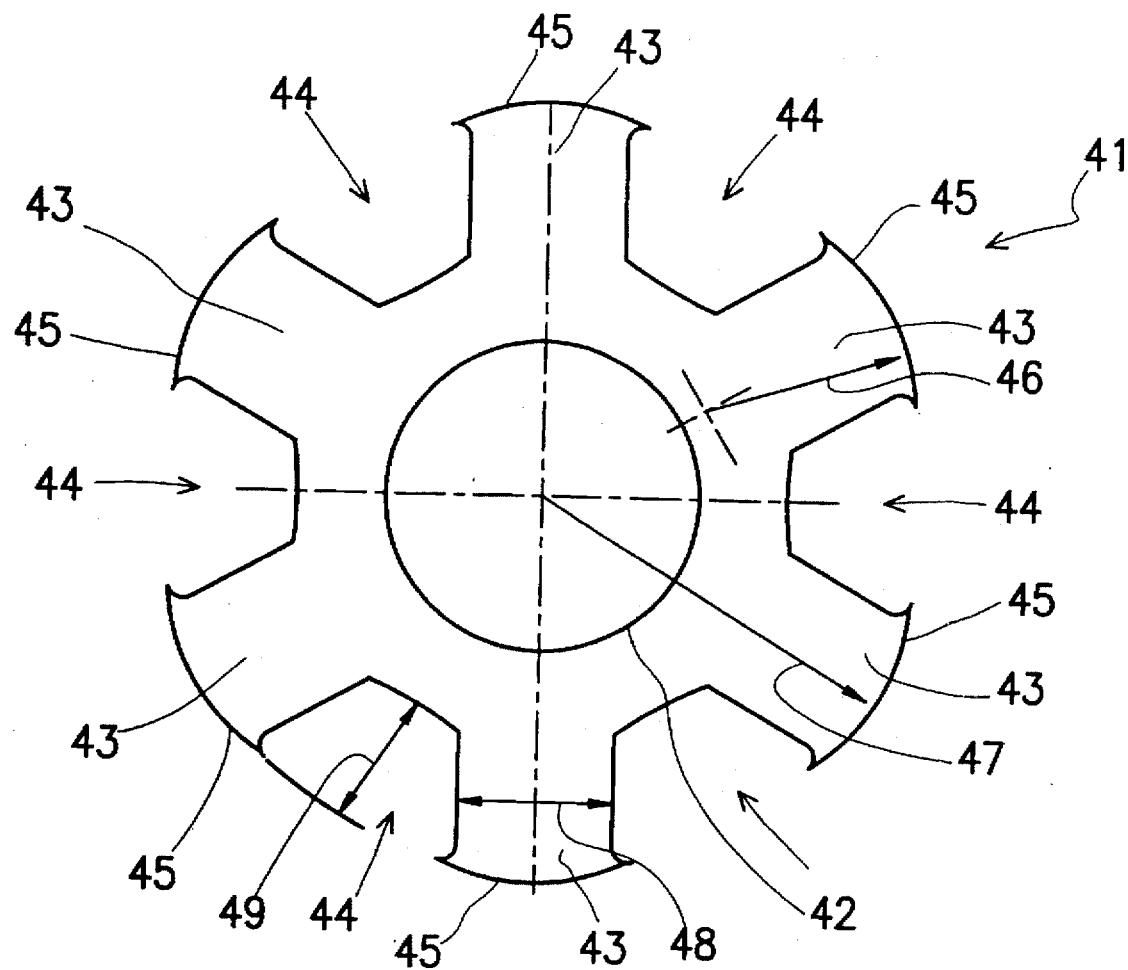
FIG. 4 is a top view showing the new stator design of a brushless motor according to a preferred embodiment of the invention.

Referring next to FIG. 4, this shows a top view of the stator in a brushless motor according to the preferred embodiment of the invention, and that is, the shape of the top 23 and bottom 24 magnetic pole plates as shown in FIG. 2. The external profile of the stator of this brushless motor includes: a central circular hole 42, a number of salient poles 43 surrounding the central circular hole 42, and a slot opening 44 between every two adjacent salient poles 43. The outer rim of each salient pole 43 is a circular arc 45 whose radius $R_S$ (labeled as 46 in FIG. 4) is less than 0.95 $R_M$ but larger than $\pi/P \times R_M$, wherein $R_M$ represents the radius from the center to the outer rim of stator 41 (labeled as 47 in FIG. 4), P is the number of magnetic poles for the motor which is the same as the number of permanent magnetic pole pieces of the circular ring magnet 31 as shown in FIG. 2. The neck width $W_S$ of the salient poles 43 (labeled as 48 in FIG. 4) is less than $2\pi/P \times R_M - g$ but larger than $\pi/2P \times R_M$, wherein g represents the width of the air-gap between the salient poles 43 and the circular ring magnet 31. The depth $D_S$ of the slot openings (labeled 49 in FIG. 4) is less than $2.5\pi/P \times R_M$ but larger than $\pi/P \times R_M$.

In this preferred embodiment, there are three major changes in design regarding the external appearance of the stator, including:

(1) arcs are used for the outer rim of salient poles whose radius is defined within specific boundaries;

(2) neck width of salient poles is defined within specific limits; and (3) depth of slot openings is defined within a specific range.

These three changes do not have to be applied simultaneously in the stator design, because even when used singly or in various combinations there are already some improvements in the performance of the motor.

Following the changes in external appearance of stator according to this invention, there are several advantages:

(1) raising the quantity of effective magnetic flux:

In conventional brushless motor design, there are flux leakage at the boundary between poles in the circular ring magnet, and furthermore, there is no shield between the slot opening of the stator and the poles of the circular ring magnet and therefore can easily lead to magnetic flux cross linking and flux leakages. According to this invention, through the definition of the neck width of the salient poles and the depth of slot openings, the shape of the slot opening is modified to let more the magnetic flux enter through the salient poles of a stator, thus resulting in the reduction of self-cross linking, the lowering of flux leakages and the raising the quantity of effective magnetic flux.

(2) reducing cogging torque:

With the shaping of the outer rim of salient poles into a circular arc according to this invention, the coenergy fluctuation with the angle in such a system becomes less severe, and therefore can greatly reduce the cogging torque of such a motor.

Brushless motor utilizing the principles of this invention has already been applied to 8X speed CD-ROM. Results after careful testing and monitoring have shown tremendous improvements in cogging torque of up to 90% reduction. Moreover, the quantity of effective magnetic flux in the system is also increased. The induced electromotive force coefficient (Ke) increased by approximately 20%. And the performance of the motor is improved.

While the invention has been described by way of example and in terms of the preferred embodiment, it is to be understood that the invention is not limited to the disclosed embodiments. To the contrary, it is intended to cover various modifications and similar arrangements as would be apparent to those skilled in the art. Therefore, the scope of the appended claims, which define the invention, should be accorded the broadest interpretation so as to emcompass all such modifications and similar structures.

What is claimed is:

1. A brushless motor stator for an axially wound, single-phase brushless motor with a diametrical air-gap having a plate structure with at least one plate, the profile of said plate comprising:
   a central circular hole;
   a plurality of salient poles surrounding said central circular hole, wherein an outer rim of each said salient pole is in the form of an arc; and
   a slot opening between every two adjacent said salient poles, wherein the radius of said arc satisfies the following inequality relation:

$$\pi/P \times R_M < R_S < 0.95 R_M;$$

where $R_M$ represents the radius from the center to the outer rim of the brushless motor stator; $R_S$ represents the radius of said arc; and P represents the number of poles of permanent magnets used in said motor.

2. A brushless motor stator according to claim 1, wherein a neck width of said salient poles satisfies the following inequality relation:

$$\pi/2P \times R_M < W_S < 2\pi/P \times R_M - g;$$

where $R_M$ represents the radius from the center to the outer rim of said brushless motor stator; $W_S$ represents said neck width of said salient pole; P represents the number of poles of permanent magnets used in said motor; and g represents the air-gap width between said salient poles and said permanent magnets.

3. A brushless motor stator according to claim 1, wherein the depth of said slot openings satisfies the following inequality relation:

$$\pi/P \times R_M < D_S < 2.5\pi/P \times R_M;$$

where $R_M$ represents the radius from the center to the outer rim of said brushless motor stator; $D_S$ represents the depth of said slot opening; P represents the number of poles of permanent magnets used in said motor.

4. A brushless motor stator for an axially wound brushless, single-phase motor with a diametrical air-gap having a plate structure with at least one plate, the profile of said plate comprising:
   a central circular hole;
   a plurality of salient poles surrounding said central circular hole, wherein the outer rim of each said salient pole is in the form of an arc; and
   a slot opening between every two adjacent said salient poles, wherein the neck width of said salient poles satisfies the following inequality relation:

$$\pi/2P \times R_M < W_S < 2\pi/P \times R_M - g;$$

where $R_M$ represents the radius from the center to the outer rim of said brushless motor stator; $W_S$ represents the neck width of said salient pole; P represents the number of poles of permanent magnets used in said motor; and g represents the air-gap width between said salient poles and said permanent magnets.

5. A brushless motor stator according to claim 4, wherein the depth of said slot openings satisfies the following inequality relation:

$$\pi/P \times R_M < D_S < 2.5\pi/P \times R_M;$$

where $R_M$ represents the radius from the center to the outer rim of said brushless motor stator; $D_S$ represents the depth of said slot opening; and P represents the number of poles of permanent magnets used in said motor.

6. A brushless motor stator for an axially wound brushless, single-phase motor with a diametrical air-gap having a plate structure with at least one plate, the profile of said plate comprising:
   a central circular hole;
   a plurality of salient poles surrounding said central circular hole, wherein an outer rim of each said salient pole is in the form of an arc; and
   a slot opening between every two adjacent said salient poles, wherein the depth of said slot openings satisfies the following inequality relation:

$$\pi/P \times R_M < D_S < 2.5\pi/P \times R_M;$$

where $R_M$ represents the radius from the center to the outer rim of said brushless motor stator; $D_S$ represents the depth of said slot opening; and P represents the number of poles of permanent magnets used in said motor.

7. A brushless motor stator according to claim 6, wherein the radius of said arc satisfies the following inequality relation:

$$\pi/P \times R_M < R_S < 0.95 R_M;$$

and further that a neck width of said salient poles satisfies the following inequality relation;

$$\pi/2P \times R_M < W_S < 2\pi/P \times R_M - g;$$

where $R_M$ represents the radius from the center to the outer rim of said brushless motor stator; $W_S$ represents the neck width of said salient pole; P represents the number of poles of permanent magnets used in said motor; g represents the air-gap width between said salient poles and said permanent magnets; and $R_S$ represents the radius of said arc.

8. A brushless motor stator according to claim 1, wherein the meterial of said plate includes silicon steel sheet.

9. A brushless motor stator according to claim 4, wherein the meterial of said plate includes silicon steel sheet.

10. A brushless motor stator according to claim 6, wherein the meterial of said plate includes silicon steel sheet.

* * * * *